Figure 1:
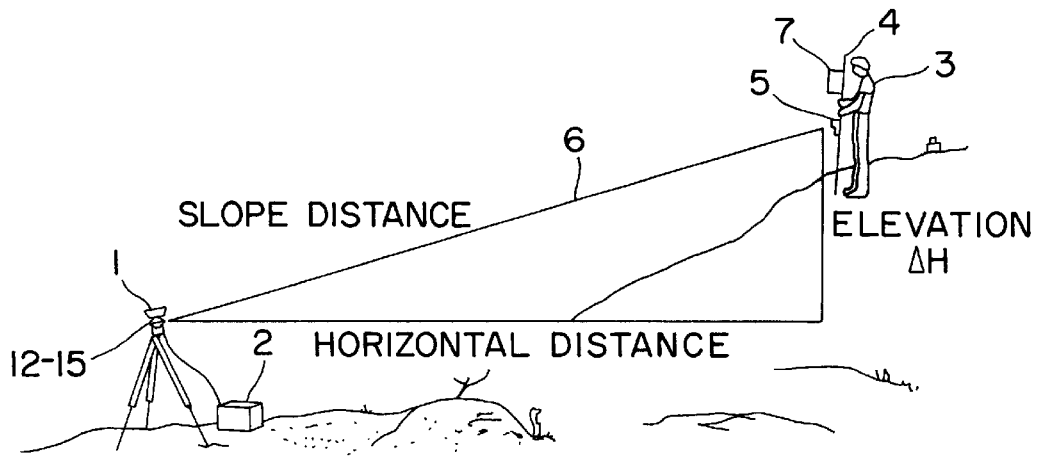

United States Patent [19]

Hertzman et al.

[11] Patent Number: 5,828,057
[45] Date of Patent: Oct. 27, 1998

[54] METHOD AND ARRANGEMENT FOR TARGET SEEKING

[75] Inventors: Mikael Hertzman, Sollentuna; Anders Näslund, Täby, both of Sweden

[73] Assignee: Spectra Precision AB, Danderyd, Sweden

[21] Appl. No.: 836,315

[22] PCT Filed: Sep. 13, 1996

[86] PCT No.: PCT/SE96/01147

§ 371 Date: May 12, 1997

§ 102(e) Date: May 12, 1997

[87] PCT Pub. No.: WO97/10517

PCT Pub. Date: Mar. 20, 1997

[30] Foreign Application Priority Data

Sep. 14, 1995 [SE] Sweden .................................. 9503188

[51] Int. Cl.⁶ .............................. G01B 11/26; G01C 3/08
[52] U.S. Cl. .................. 250/225; 250/559.38; 356/3.06; 356/4.07
[58] Field of Search .............................. 250/225, 559.38; 356/3.01, 3.02, 3.06, 4.01, 4.07, 5.13, 5.14, 140, 141.1, 141.2, 152

[56] References Cited

U.S. PATENT DOCUMENTS

| | | |
|---|---|---|
| 4,030,832 | 6/1977 | Rando et al. . |
| 4,530,600 | 7/1985 | Lopez . |
| 4,688,934 | 8/1987 | Clark . |
| 4,712,915 | 12/1987 | Kosakowski et al. ............... 356/141.1 |
| 4,763,361 | 8/1988 | Honeycutt et al. . |
| 4,916,324 | 4/1990 | Meier ................................. 250/559.38 |

FOREIGN PATENT DOCUMENTS 37 11 634 A1   1/1993   Germany .

*Primary Examiner*—Stephone B. Allen
*Attorney, Agent, or Firm*—Pollock, Vande Sande & Priddy

[57] ABSTRACT

The invention relates to a method and arrangement for target seeking, where a rotatable instrument emits an electromagnetic radiation and automatically searches for a target reflector by detecting whether reception occurs of electromagnetic radiation received by the target reflector and reflected back to the instrument. In the beam path of the electromagnetic radiation, polarization of the electromagnetic radiation, polarization modulation of the polarization direction on the electromagnetic radiation by alternately changing it, and polarization of the electromagnetic radiation take place in sequence. At least on of these steps is performed at the target reflector. Checking of the detected reflector is carried out by testing if the received radiation changes at the same rate as the modulation of the polarization direction. Only targets are accepted which give different signal strengths at said rate for the received radiation.

10 Claims, 2 Drawing Sheets

METHOD AND ARRANGEMENT FOR TARGET SEEKING

The present invention relates to a method of the type which is mentioned in the introduction to claim 1 and an arrangement for carrying out the method.

Target seeking systems, with or without subsequent target following, are more and more common in, for example, laying out work. A distance measuring instrument is automatically rotatable horizontally and vertically. A target is looked for with electromagnetic radiation, preferably light in the infrared or visible wavelengths, emitted from a target seeking and target following unit on the distance measuring instrument. After an indication that the electromagnetic radiation has reached a detected target, the instrument can, if necessary, be held directed towards it. This target seeking and target following unit is preferably separate in relation to the measuring system of the distance instrument. The target can be equipped with a reflector. Detection takes place when the unit receives electromagnetic radiation reflected from the target. The instrument is in that case positioned in a suitable place in the region of which the topography is to be measured.

The reflectors on the target are preferably at least one cube corner prism, which gives a reflected beam in the opposite direction to the transmitted beam and which is placed on a setting-out pole against which the measuring is to take place, which is placed by an operator at chosen positions.

The advantage of such systems is that they can be operated by only one operator through the seeking system of the instrument automatically looking for and focusing its beam on the reflector.

A problem of such systems, however, is that there are other reflectors than the target reflector in the surroundings. It is not desirable to measure these but the instrument can become focused on them. Examples of such reflectors can be traffic signs, vehicle number plates, bicycle reflectors and the like.

The object of the invention is to achieve a method for automatic target seeking and possibly target following, for example for a distance measuring instrument, where all reflectors are ignored, except the one or those which is/are placed on a target.

This object is achieved with a method with the characteristics given in claim 1. Further characteristics, developments and an arrangement for performing the method are given in the other claims.

In order to ignore all other reflectors than the reflectors on the target, a combination of polarizing and controllable polarization modulating arrangements placed in the path of the electromagnetic beam to and from the instrument are used. One of these arrangements is placed according to the invention on each target reflector. Preferably at least one polarizing and/or controllable polarization modulating arrangement is placed in the path of the electromagnetic beam on the instrument. The controllable polarization modulating arrangement is controllable to alternately change the polarization direction of the beam. A check of the discovered reflector is performed by testing if the received beam alternately changes at the same rate as the polarization changes on the controlled polarization modulating arrangement. Only targets are accepted which give different signal strengths at the same rate as the received beam.

The polarization modulating arrangement and/or at least one of the polarizing arrangements are preferably placed on the target seeking and target following unit either on its light emitting side or light receiving side. Each target the instrument discovers during its search for a correct target is checked for its degree of reflection of incoming beams while the polarization is alternatively changed by the polarization modulating arrangement, which is for example a Pockels cell, a unit with controllable liquid crystals or the like. The polarization modulating arrangement can be part of a combined polarizing and polarization modulating arrangement and in that case can also have a continuous change between different polarization planes and can, for example, be made of a continuously rotating polarizer or a rotating unit with alternately placed polarizers with opposing polarizations. If the polarization modulating arrangement is placed on a target reflector, electronics for its control and power supply must be available on the target reflector.

It is obvious that the idea of the invention is not limited to the use in setting-out work but can also be adapted for all types of systems where an instrument emitting electromagnetic radiation shall look for and at least temporarily lock onto a target reflector or several target reflectors in sequence. Examples of such systems are e.g. self-orientated vehicles, flying equipment and the like. The targets can be fixed and in that case target following is unnecessary.

Figure 2:
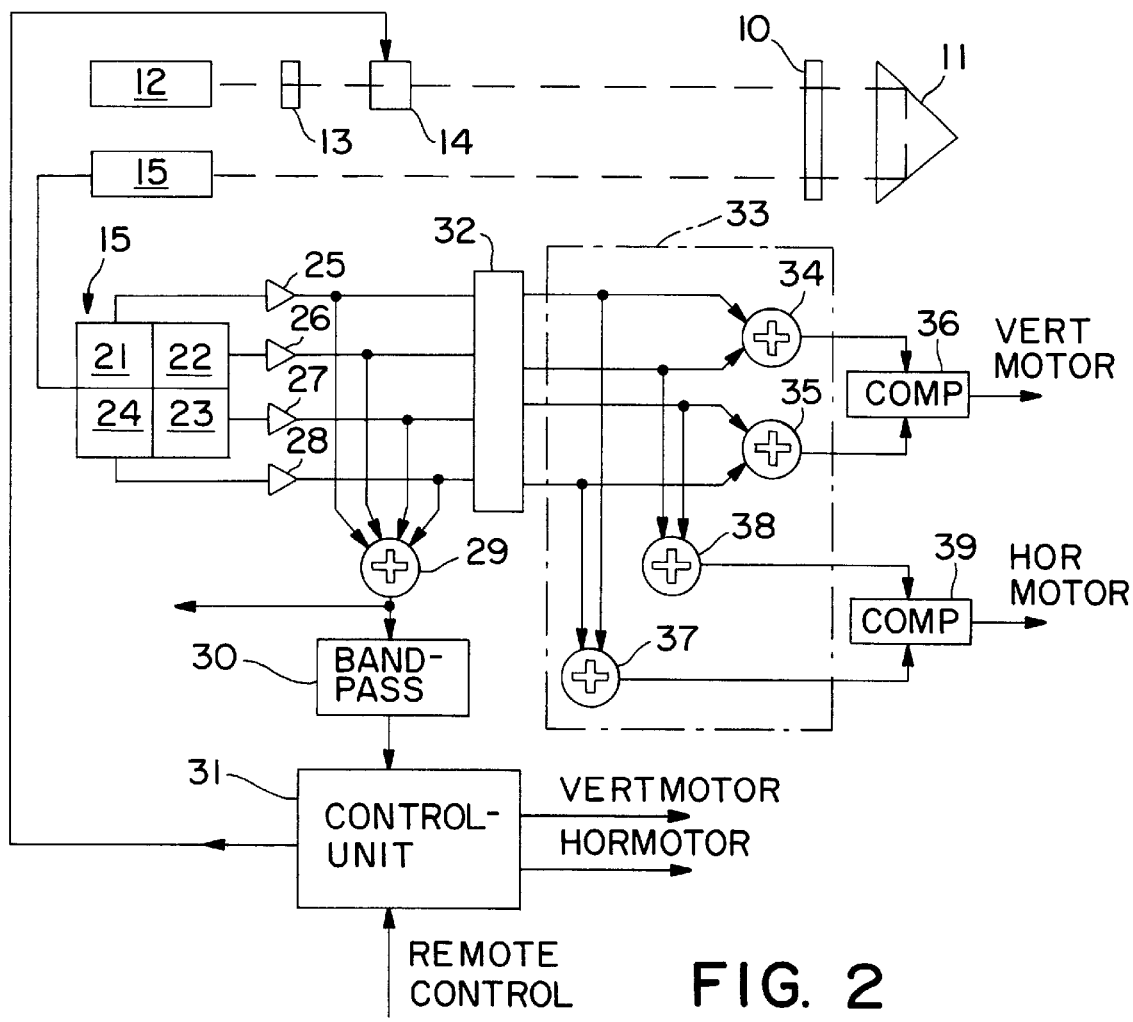
Figure 3:
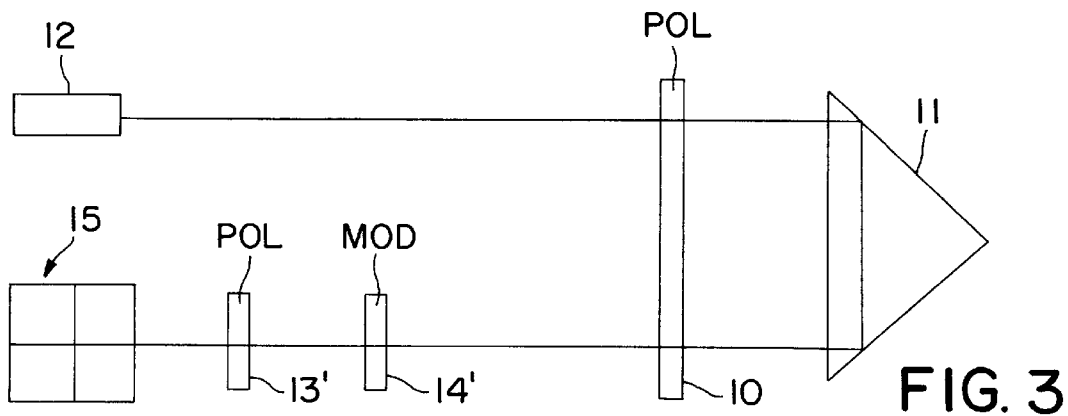
Figure 4:
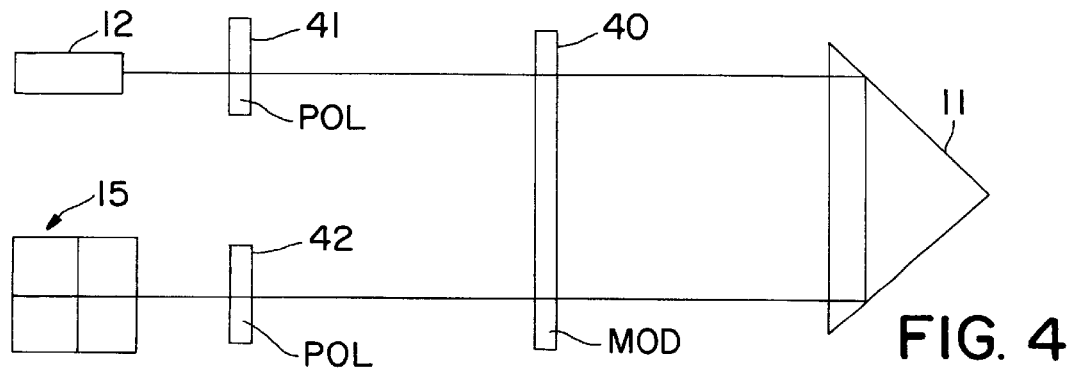
Figure 5:
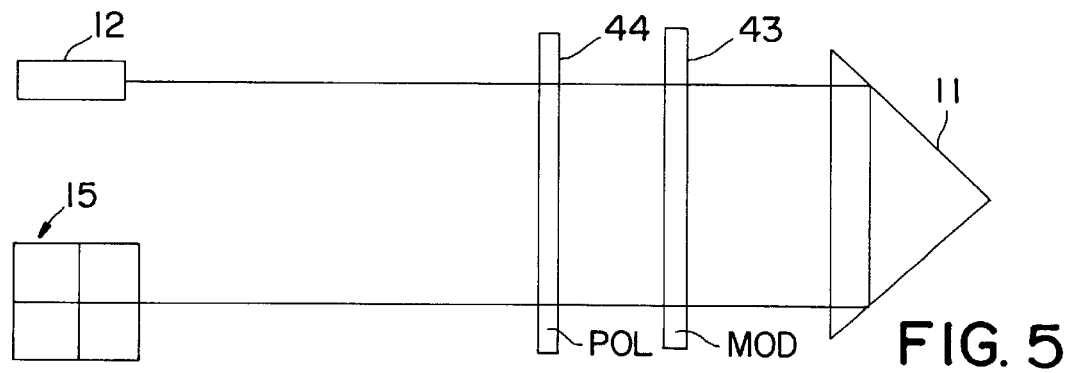
Figure 6:
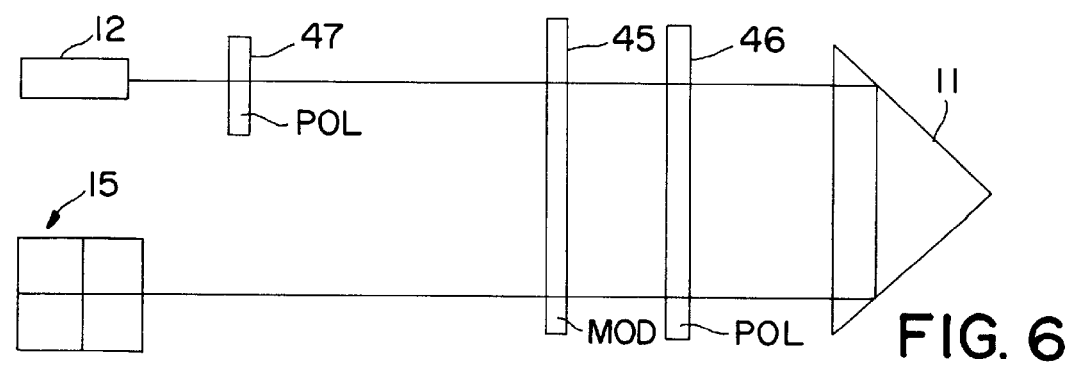

The invention is described in more detail below with reference to the accompanying drawings, where FIG. 1 shows a view of the instruments and targets placing in a setting-out operation, FIG. 2 shows schematically an embodiment of an arrangement according to the invention with the optical arrangement and the quadrature detector and a control- and recognition circuit, FIG. 3 shows schematically a second embodiment of the optical arrangement according to the invention, FIG. 4 shows a third embodiment of the optical arrangement according to the invention, FIG. 5 shows schematically a fourth embodiment of the optical arrangement according to the invention, and FIG. 6 shows schematically a fifth embodiment of the optical arrangement according to the invention.

FIG. 1 shows an unmanned electronic distance measuring instrument 1, which is equipped with a control and calculation equipment 2 shown schematically here as a box. The control and calculation equipment comprises a control computer which controls the distance measuring function of the instrument, controls the measuring of its rotation in both the vertical and horizontal directions, and performs calculations of the measuring results as a consequence of the alignment of the instrument. This means that the instrument measures the sloping distance towards a reflector 5 on a setting-out pole 4 and the angular positions in the vertical and horizontal directions, and calculates the horizontal length, the height difference and the direction in the horizontal plane to the reflector. The control system also includes a receiver for receiving control signals from an operator 3 by the setting-out pole 4. Furthermore there is a preferably separate target seeking and target following unit 12-15 on the instrument coupled to the control and calculation equipment 2.

Consequently, the pole 4 has a reflector arrangement 5 with at least one reflector against which the measuring beam 6 of the instrument shall be directed during measuring, and a control unit 7 operatable by an operator in order to send manoeuvre signals, e.g. radio signals, optical signals or the like, to the control equipment 2 of the instrument in order to mark when the measuring is to take place. Also the alignment beam from unit 12-15 is aligned against the reflector arrangement 5. If desired, the operator can, by means of remote control, coarsely align the instrument towards the target before the target seeking and target following unit is activated. The latter can, if the instrument is misaligned with a large deviation from the target, give a quicker alignment than if the instrument itself had to search for the target over a wide region.

It should be noted that the use of the alignment arrangement according to the invention for a distance measuring instrument is only given as an example and that other areas of use are also conceivable.

Other systems for performing target seeking and target following are already known, see e.g. U.S. Pat. No. 5 313 409 and U.S. Pat. No. 4 030 832. As the invention only concerns checking that the instrument searches for an intended target, in order to later possibly be locked onto it and to discriminate against possible false targets, only these functions will be described.

In the embodiment of the invention shown in FIG. 2, which is the preferred embodiment, a first polarizing arrangement 13, from now on called polarizer, and a polarization modulating arrangement 14, from now on called modulator, are placed on the emitting side of the instrument. The arrangement 14 is controllable to alternately change the polarization direction of the beam. A second polarization arrangement 10, from now on called polarizer, is placed in front of a reflector 11, preferably a cube corner prism, placed by the target (not shown in its entirety) in order to reflect the emitted beam straight back against the direction of emission. The polarizers are rotated so that they either give the same angle of polarization or a polarity rotation displaced 90° in relation to each other, and can comprise polaroids. Preferably horizontal or vertical polarization is used but it is also possible to use right/left circular polarization.

The prism 11 can be one of the prisms in the unit 5 or can be separate and placed at a suitable distance from the unit 5.

A source 12 of electromagnetic radiation, e.g. a laser or light emitting diode, from now on called a light source, in the instrument emits electromagnetic radiation. The polarizer 13 placed in the beam from the light source 12 takes away one of the polarization planes of the light. Alternatively the light source 12 itself can emit polarized light and in this case polarizer 13 is not necessary. The polarization plane of the light emitted from the unit 12,13 can be controlled by the modulator 14 so that the light polarized by polarizer 13 alternately can pass the modulator unchanged or can have its polarization plane rotated 90° by modulator 14.

The modulator 14 can for example comprise controllable liquid crystals or can be a rotating disc with alternating polarisation plane rotating fields and open fields, or fields with alternating polarity rotation. The polarizer 13 and modulator 14 can even be the same unit which is equipped with liquid crystals controllably changeable between conditions with different polarization qualities, or a rotating disc with alternating fields which alternately change the polarization of the incoming light, preferably between the polarization of the polarizer and a polarization rotated 90° to this, or be formed of a single rotating polarizer, which continuously rotates the polarization of the emitted light. It should be noted that in the following embodiments, the polarizer and modulator of a controllable polarization arrangement can also be formed in the above described way.

When the radiation sent towards prism 11 has a polarization corresponding to the polarization of the polarizer 10, the electromagnetic radiation can pass from the light source 12, be reflected by prism 11 and received by detector 15. When the polarization of the beam sent towards the prism is rotated 90° to the polarization direction of the polarizer 10, practically no light reaches the detector 15. Consequently, the detector receives radiation modulated with the same frequency as the modulation of modulator 14 when an intended target is detected. If aligning has taken place against a non-acceptable target, the detector 15 receives approximately the same light intensity independent of the modulation of modulator 14, and the target is ignored.

The invention consequently is built upon that the electromagnetic beam from and to the instrument passes through a polarizer on both sides of a polarization modulator.

As is shown in FIG. 3, the corresponding modulation function can be achieved if a modulator 14' and a polarizer 13' (or a combination unit with the combined function of these units) is placed in front of the detector 15 instead of in front of the light source 12. A polarizer 10 is placed in front of prism 11. In this case the light emitted from the light source 12 is unpolarized, which means that the light source 12 must itself be unpolarized. The polarizers 10 and 13' and the modulator 14' in the embodiment shown in FIG. 3 can have the same characteristics as those which have been described above in connection to FIG. 2.

As shown in FIG. 4, the corresponding modulation function can also be achieved, if the modulator 40 is placed by the prism 11 so that the polarizer in front of the prism 11 is replaced with a modulator, which in such a case must act together with the same polarization angle on both the incoming and outgoing beam of the prism, so that the combined modulation will be as if the beam was only modulated once. A fixed polarizer 41 is placed in front of the light source 12, and a fixed polarizer 42 with the same, or rotated 90°, polarization rotation as the polarizer 41, preferably the same, is placed in front of the detector 15. If the polarizers 41 and 42 have the same polarization rotation, they can be made of the same component placed, for example, as a disc in front of the instrument. The light source 12 is unpolarized. It should be noted that the polarizer 41 can be formed by the light source itself if this is a light source which emits polarized light. In this case only polarizer 42 is used as a separate polarizer.

The modulator 40 in the embodiment shown in FIG. 4 can, for example, be a rotating polaroid, with its axis of rotation preferably placed to the side of the prism 11, with polarizer and without polarizer or polarizers with alternating polarization rotations, but it is also conceivable to have the axis of rotation, for example, running through the center of the prism.

As shown in FIG. 5, the corresponding modulation function can also be achieved if both a modulator 43 and a polarizer 44 are placed by the prism 11 with the modulator 43 nearest to the prism. The polarizer 44 functions here like two polarizers, i.e. for both the radiation emitted from the instrument and for the radiation reflected by the prism 11. In this embodiment the modulator should cover the whole of the prism as the radiation emitted from the instrument is diverging and will cover the whole of the front surface of the prism 11 and must pass the polarizer 44 before the modulator. The light source 12 is unpolarized. The modulator 43 in the embodiment shown in FIG. 5 can have the same design as that described in FIG. 4.

As shown in FIG. 6, the corresponding modulation function can also be achieved if both a modulator 45 and a polarizer 46 are placed by the prism 11 with the polarizer 46 placed nearest to the prism. The polarizer 46 functions here as a single polarizer which must cover the whole of the prism, as the light must pass the polarizer before the modulator. The modulator 45 can cover half or the whole of the prism. If the modulator covers the whole of the prism, it should only rotate the polarization 45° each time the light passes through it (in total 90°). In order to have a polarizer on both sides of the modulator, a polarizer 47 is placed by the light source 12, or the light source 12 itself can emit polarized radiation.

Reference is made again to FIG. 2. For all the above mentioned embodiments it is valid that the emitted electromagnetic radiation preferably has a relatively large divergence, e.g. ±1 degree. It is reflected by the prism 11 and focused (focusing means not shown) onto detector 15, which is formed like a quadrature detector, for the sake of clarity shown in two projections one below the other in the Figure.

As is shown in the lower projection in FIG. 2, the detector 15 comprises four detector elements 21, 22, 23, 24, which are in contact with each other. It is naturally conceivable to have more detector elements, for example placed in rings in quarter-circle sectors outside each other, in order to make the directing of the received radiation in towards the middle of the detector more reliable than with a four element detector. The principle of the directing will, however, not be different from that described below. The signals from the detector elements are each amplified in their own amplifiers 25, 26, 27 and 28.

During the search procedure for looking for a target reflector to lock onto, a sum signal from the detectors is used, i.e. the outputs from amplifiers 25–28 are fed to anadder 29. Its output is connected to a bandpass filter 30 with the pass band around the alternating frequency of the modulator 14 alternating between different polarizatons. The output of the bandpass filter 30 is connected to a control unit 31. In the embodiment shown in FIG. 2, the control unit 31 controls the modulator 14, (or a combination of the polarizer 13 and the modulator 14). If the embodiment shown in FIG. 3 is used, the modulator 14' is controlled instead. In the embodiment shown in FIG. 4, the modulator 40 is controlled instead, in FIG. 5 the modulator 43 or in FIG. 6 the modulator 46.

As long as no signal is received from the bandpass filter 30, the control unit gives control signals to the vertical and horizontal motors of the instrument to rotate such that the measuring beam of the instrument is directed in accordance with a predetermined search pattern. The control unit 31 is suitably a computer or is comprised in the other computer equipment of the instrument and has the search pattern programmed into the computer's software.

When a signal is received from the bandpass filter 30, which means that an intended target has been detected, the control unit 31 breaks off the controlling of the motors according to the search pattern and activates a normally broken through-connection circuit 32 for fine alignment towards the detected target reflector and later possible servo control for holding the instrument aligned with it. The through-connection circuit 32 thus couples the signals from the amplifiers 25–28 to a fine alignment circuit 33 shown inside a dashed rectangle.

The instrument is aligned against the target with the help of the servomotors for vertical and horizontal alignment of the instrument so that equal amounts of light reach the separate detector elements 21–24.

The signals from the two upper detector elements 21 and 22 are added together in an adder 34. The signals from the two lower detector elements 24 and 23 are added together in an adder 35. The signals of the adders 34 and 35 are compared with each other in a comparator 36, which servocontrols the vertical motor towards one or the other direction as a consequence of the output signal from the comparator 36 and its sign, so that its output signal is held close to zero.

The signals from the two left detector elements 21 and 24 are added together in an adder 37. The signals from the two right detector elements 22 and 23 are added together in an adder 38. The signals of the adders 37 and 38 are compared with each other in a comparator 39, which servocontrols the horizontal motor towards one or the other direction as a consequence of the output signal from the comparator 39 and its sign, so that its output signal is held close to zero.

This servocontrolling continues as long as the bandpass filter gives a signal to the control unit 31, or until the control unit 31 is controlled to commence searching for another target reflector through outside control, e.g. controlled by the operator 3.

It should be noted that the circuit elements shown are those essential in order to explain how the invention works, and that further circuit elements will be found in a real embodiment in order to produce signals adapted to produce the described functions. For example, the through-connection circuit comprises converter elements for supplying direct current signals to the circuit 33 which are more suitable for servo control than alternating voltage signals.

It should also be noted that the circuit shown in FIG. 2 is only an embodiment and that many other circuits are possible within the scope of the invention as given in the claims. For example, the search for reflectors in the first instance could take place without controlling of the modulator, i.e. without using the polarization changes. Thus, preferably, the light signal transmitted by the light source 12 is amplitude-modulated so that only reflections of the emitted beam shall be detected, and scatter light in the surroundings should be ignored.

This modulating is consequently done by the light source itself and the modulating takes place at the frequency which corresponds to the frequency of the bandpass filter 30. When signals are received from the detector 15, different polarization planes with extremely slow frequencies are tested, for example, through changing the modulator between different polarization planes, almost statically either by hand or via instructions in a computer program for the control of the instrument, and in this way decide if the target is a true target. If no difference in the received signal is then detected, the search phase continues.

Alternatively it is possible to amplitude-modulate the light source with a frequency and, when a reflector is detected, couple in the controlling of the polarization modulator with a completely different frequency in order to investigate if this reflector is a target reflector. The bandpass unit 30 in this embodiment can comprise either two parallel bandpass filters with different center frequencies or a common filter with two passbands. In this way different frequencies for amplitude-modulating and polarization-modulating can be used. When, during only amplitude-modulating, a signal with the amplitude-modulating frequency is received, the control of the modulator 14 (or 14', 40, 43, 46) is connected. The control unit 31 investigates consequently if a varying signal with the polarization frequency is received from the filter 30 and continues the search procedure if such a signal is not received.

In the above it has been stated that during use of the method and the arrangement according to the invention in a distance-measuring instrument, the target seeking and target following system is separated from the measuring system. The measuring system, when it is based on emitted, reflected and received modulated radiation, must have a very stable and high amplitude-modulated signal in the emitted light and even the received modulated measuring signal must be completely stable in order for a good resolution to be received. In one case, when the best possible resolution is not so important, it is conceivable to combine the measuring, target seeking and target following arrangement by producing the modulating of the measuring beam with the polarization changes, which then must be performed with a high frequence, for example, over 100 kHz. The light source 12 then emits a constant, i.e. unmodulated, radiation.

We claim:

1. Method for searching for targets, where an instrument emits an electromagnetic radiation and searches for a target reflector by detecting if reception takes place of a received electromagnetic radiation reflected from the target reflector back to the instrument, characterized in that in the radiation direction of the electromagnetic radiation, the following procedural steps take place after one another:
   a. polarization of the electromagnetic radiation;
   b. polarization modulation of the polarization direction of the electromagnetic radiation through alternately changing it;
   c. polarization of the electromagnetic radiation;
wherein at least one of the procedural steps mentioned under points a) to c) is performed near to the target reflector (11); and checking of the detected reflector is performed by testing if the received radiation changes alternately at the same rate as the modulation of the polarization direction, and only accepting a target which gives different signal strengths for the received radiation at said rate.

2. Method according to claim 1, characterized in that the search for the target reflector first is performed without polarization modulation with conventional methods, and only after a reflector has been detected is the polarization modulation started, together with checking of whether the reflector is a target reflector.

3. Method according to claim 1, characterized in that during the search for a target reflector, the polarization modulation is performed with a predetermined modulation frequency, whereby reflected signals with the modulation frequency can solely be obtained from a target reflector.

4. Target seeking arrangement for a rotatable instrument comprising a unit (12) which emits a beam, a detector unit (15) which is arranged to detect reception of a radiation received and reflected back from a target reflector (11) to the instrument, characterized by
   a. a polarization modulating arrangement (14; 14'; 40; 43; 45) arranged in the beam path of the radiation, controllable to alternately change the polarization direction of the radiation;
   b. at least one polarization arrangement (10,13; 10,13'; 41,42; 44; 46,47) with a fixed polarization so placed in the beam of the radiation that the beam passes through the polarization arrangement both before and after the polarization modulating arrangement;
   c. whereby at least one of the above mentioned arrangements is placed by the reflector (11);
   d. a control unit (31) which controls the polarization modulating arrangement alternately between different opposing polarizations;
   e. an evaluation circuit (25-31) connected to the detector unit (15) and arranged to accept a target reflector which gives different degrees of reflection for said different polarizations.

5. Arrangement according to claim 4, characterized in that the polarization modulating arrangement (14; 14'; 43; 45) is comprised in an inseparable combination with one of the polarizing arrangements (13; 13'; 44; 45).

6. Arrangement according to claim 4, characterized in that the polarization modulating arrangement (14) is placed by the instrument to influence the emitted radiation from the radiation source, wherein one of the polarizing arrangements (10) is placed by the reflector (11).

7. Arrangement according to claim 4, characterized in that the polarization modulating arrangement (14') is placed by the instrument to influence the received radiation, wherein one of the polarizing arrangements (10) is placed by the reflector (11).

8. Arrangement according to claim 4, characterized in that the polarization modulating arrangement (40; 43; 45) is placed by the target reflector (11) and that said at least one polarizing arrangement (41,42; 44; 46,47) is placed either by the instrument or by the reflector or divided between the instrument and the reflector.

9. Arrangement according to claim 4, characterized by a control circuit (31), which performs the modulation of the electromagnetic radiation by means of control of the polarization modulating arrangement (14; 14'; 40; 43; 45) for repolarization of the electromagnetic radiation.

10. Arrangement according to claim 4, characterized in that one of the polarization arrangements comprises the light source itself, which in this case is chosen to be a light source which emits polarized light.

* * * * *